Nov. 5, 1957 R. A. MAYNE 2,812,199
HUB
Filed July 1, 1955

INVENTOR.
ROBERT A. MAYNE
BY
HIS ATTORNEYS

United States Patent Office 2,812,199
Patented Nov. 5, 1957

2,812,199
HUB

Robert A. Mayne, Dayton, Ohio

Application July 1, 1955, Serial No. 519,489

4 Claims. (Cl. 287—52.09)

This invention relates to a hub and more particularly to a self-locking hub that may be non-rotatably locked upon a shaft without the use of a key and without the use of a set screw, although not necessarily so limited.

In the manufacture of blower wheels, it is rather common practice to use a disc or a pair of discs located in the center of the wheel to provide a support for the blower wheel. These discs are made out of sheet metal and, that being the case, it is necessary to provide some type of a hub, so that the center disc can be non-rotatably attached to the drive shaft. A rather common method is to provide a machined hub that is staked into an aperture in the center of the center disc. Although this hub weighs only a few ounces, this hub and the set screw used in locking the blower on the shaft represent a substantial percent of the total cost of the wheel, a cost that is very much out of proportion to the relative weights of the parts.

It is an object of this invention to provide a tapered portion functioning as a wedge clamped against a shaft by a portion of the hub member being wrapped or tightened upon the wedge-shaped portion, to cause this wedge-shaped portion to be wedged against the surface of the shaft.

It is a further object of this invention to provide a sheet metal hub having a centrally located opening for a shaft, a marginal portion of the opening being provided with a spiral slot forming an arcuately-shaped wedge or tapered portion, the portion of the hub located outside of the spiral slot being arranged to be forced into engagement with the tapered portion to wedge this portion into engagement with a shaft to non-rotatably lock the hub on the shaft.

Other objects and advantages reside in the construction of parts, the combination thereof and the mode of operation, as will become more apparent from the following description.

Figure 1:
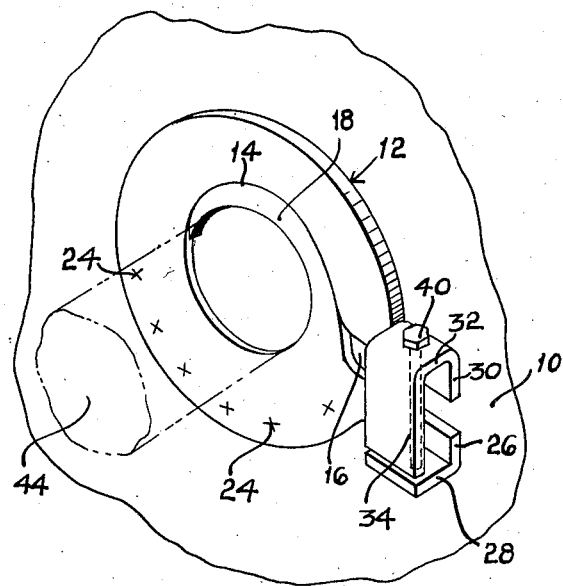
Figure 1 is a perspective view of a hub.

Referring to the drawings, the reference character 10 indicates a disc of sheet metal or any other suitable material to be non-rotatably mounted upon a shaft. This disc may be a disc supporting a pulley, a blower or any other type of a disc. A hub 12, that may be made from a stamping of sheet metal or a die casting, or molded powdered metal, or any other suitable material, is provided with a centrally disposed round opening. A spiral groove 14 extends spirally from the centrally disposed round opening outwardly to a marginal slot or gap 16. The spiral groove 14 forms a tapered or wedge-shaped portion 18 subtended by a marginal portion 20. The wedge-shaped portion merges into a portion 22 opposite the marginal portion 20. The portion 22 is spot or projection welded to the disc at spaced intervals 24.

The portion 22 is provided with a radially disposed ear portion 26 that is provided with an apertured flange 28. The portion 20 is also provided with a radially disposed ear 30 extending parallel with and in spaced relation to the ear 26. The ears 26 and 30 are located upon opposite sides of the slot 16. The ear 30 is also provided with a flange 32 extending parallel with the flange 28. This flange 28 is provided with a reentrant flange 34 directed towards the flange 28. A bolt 40 passes through the apertures in the flanges 28 and 32. The ears 26 and 30 and the flanges 28 and 32, respectively, are referred to as clamping means.

The purpose of the reentrant flange 34 is to abut the outer end of the flange 28 when a nut 42 is tightened on the bolt 40, so as to prevent the flanges 28 and 32 from collapsing, that is, the flange 34 reenforces the outer ends of the flanges 28 and 32, so as to properly lock the parts in position.

Mode of operation

The hub 12 and the disc 10 are mounted upon a shaft 44 before the nut 42 is tightened. After the hub has been properly positioned, the nut 42 is tightened on the bolt 40. As the bolt 40 is tightened, the slot 16 is closed. Then, as the bolt is tightened further, the marginal portion 20 is, so to speak, wrapped upon the wedge-shaped portion 18, urging the wedge-shaped portion in the opposite direction, so that the marginal portion 20 is urged in one direction and the wedge-shaped portion in the opposite direction. The slot 16 is reduced in width as the bolt 40 is tightened.

The wedge-shaped portion has been shown extending through an angle of 180°. This angle may be increased or decreased, depending upon the particular requirements. The wedge-shaped portions tightly clamp against the shaft, so as to non-rotatably wedge the hub on the shaft to lock the hub and the wheel, or whatever the part may be, upon the shaft 44.

Figure 2:
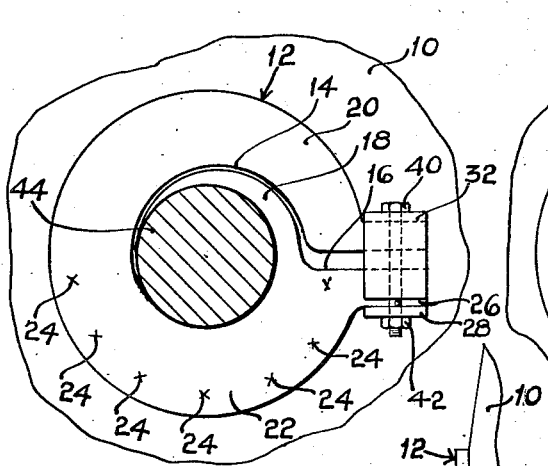
Figure 2 is a side elevational view of the hub before being clamped upon a shaft.
Figure 3:
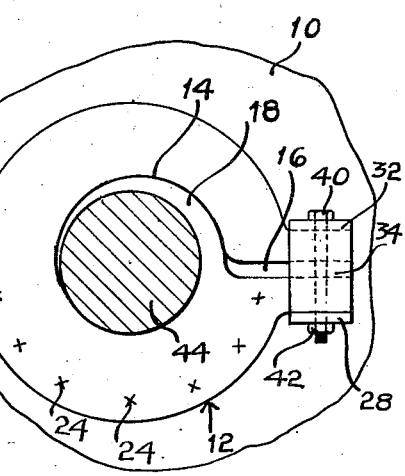
Figure 3 is a view similar to Figure 2, showing the hub clamped upon a shaft.
Figure 4:
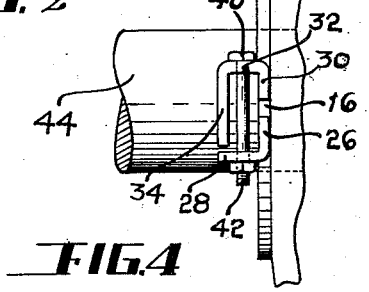
Figure 4 is a radial view of the hub.

The semi-circular portion 22 is spot welded or projection welded through an arc approaching 180°. Thereby, the disc reenforces the portion 22. The spirally tapered portion 18 extends through an arc approaching 180°, in other words, an arc complementing the portion 22. The relative lengths of these two arcs may be varied. The spiral wedge-shaped portion 18 may be made longer and, in some cases, it may be made shorter. It may approach 360° in length. The pointed end of the spiral wedge-shaped portion 18 may be serrated or toothed, so as to have teeth gouging into the outer surface of the shaft. By mounting the hub in such a manner that the shaft rotates in a counter-clockwise direction, as viewed in Figures 2 and 3, that is, rotates in the direction that the spiral wedge-shaped portion decreases or tapers, the shaft tends to draw the wedge-shaped portion more firmly into engagement with the shaft.

This hub may be used on shafts varying slightly in thickness. As the dimension of the shaft is reduced, the width of the slot 16 is reduced, that is, the slot permits tightening of the hub, so as to reduce the diameter of the opening for the shaft. In case the shaft is a little larger than the average shaft, the gap 16 would then, of course, be increased, in that the dimension of the gap 16 is governed by the size of the shaft and the tautness of the bolt 40.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A hub for use in securing an apertured sheet metal disc to a shaft, said hub including a semi-circular arcuate portion welded to the apertured sheet metal disc, a spirally wedge-shaped portion extending from the arcuate portion so that the two portions substantially surround the shaft, a third portion integral with the first portion and extending in a direction to overlap the wedge-shaped portion, an ear on the end of the first portion and an ear on the end of the third portion, and means for drawing the ears of the first and third portions together thereby causing the spirally wedge-shaped portion to wedge against the shaft.

2. A hub according to claim 1, wherein the third portion has an inner surface extending spirally over the spirally wedge-shaped portion and wherein the means for drawing the ears of the first and third portions together causes the third portion to be wrapped against the wedge-shaped portion.

3. A hub according to claim 1, wherein the means for drawing the ears of the first and third portions together includes apertured flanges extending radially to the hub and a bolt extending tangentially through the apertures for drawing the flanges toward each other.

4. A hub having an outer portion adapted to be permanently secured to a disc mounted upon a shaft, said hub consisting of a sheet member of metal, having a centrally disposed opening for the shaft, said sheet member having a spiral groove extending from the opening in the center to a marginal gap, said groove forming a tapered or wedge-shaped inner portion subtended by an integral marginal portion, said tapered or wedge-shaped portion merging into a portion extending from the tapered portion and united to said marginal portion, clamping means projecting from the juncture between the tapered portion and the portion extending from the tapered portion, clamping means projecting from the end of the marginal portion and means for urging the clamping means toward each other so as to wedge the tapered portion against the shaft.

References Cited in the file of this patent

UNITED STATES PATENTS

| | | |
|---|---|---|
| 150,261 | Shortt | Apr. 28, 1874 |
| 245,696 | Black | Aug. 16, 1881 |
| 729,534 | Boss | June 6, 1903 |
| 2,612,395 | Russell | Sept. 30, 1952 |